(12) United States Patent
Sugihara et al.

(10) Patent No.: US 11,695,576 B2
(45) Date of Patent: *Jul. 4, 2023

(54) TRANSACTION VERIFICATION THROUGH ENHANCED AUTHENTICATION

(71) Applicant: EBAY INC., San Jose, CA (US)

(72) Inventors: Kevin Sugihara, San Jose, CA (US); Bradley Wardman, Phoenix, AZ (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/369,260

(22) Filed: Jul. 7, 2021

(65) Prior Publication Data

US 2021/0336803 A1 Oct. 28, 2021

Related U.S. Application Data

(63) Continuation of application No. 15/159,398, filed on May 19, 2016, now Pat. No. 11,075,767, which is a
(Continued)

(51) Int. Cl.
*H04L 9/00* (2022.01)
*H04L 9/32* (2006.01)
(Continued)

(52) U.S. Cl.
CPC .......... *H04L 9/3271* (2013.01); *G06F 21/445* (2013.01); *H04L 9/14* (2013.01);
(Continued)

(58) Field of Classification Search
CPC . H04L 63/1466; H04L 63/10; H04L 63/0869; H04L 63/08; H04L 63/06;
(Continued)

(56) References Cited

U.S. PATENT DOCUMENTS 7,257,836 B1 8/2007 Moore et al.
8,793,359 B1 7/2014 Fiebig et al.
(Continued)

FOREIGN PATENT DOCUMENTS

CN 101421754 A 4/2009
CN 101427268 A 5/2009
(Continued)

OTHER PUBLICATIONS

Notice Of Allowance received for Korean Patent Application No. 10-2017-7009711, dated Feb. 23, 2021, 3 Pages(2 Pages of Official Copy & 1 page of English Translation).
(Continued)

*Primary Examiner* — Josnel Jeudy
(74) *Attorney, Agent, or Firm* — Shook, Hardy & Bacon LLP

(57) ABSTRACT

Systems and methods for authenticating requests to use an Application Programming Interface ("API") are described. In some embodiments, a request to use an API is received. Based on a comparison of the request to use the API with a pattern of activity associated with the client, a determination is made whether the client deviates from an expected behavior. Once a determination that the client deviates from the expected behavior is made, an authentication challenge is generated and issued. In some embodiments, the comparison of the request to use the API with a pattern of activity involves comparing transactional attributes of the request to use the API with past client behavior.

20 Claims, 4 Drawing Sheets

Related U.S. Application Data continuation of application No. 14/496,160, filed on Sep. 25, 2014, now Pat. No. 9,363,267.

(51) Int. Cl.
*H04L 9/40* (2022.01)
*G06F 21/44* (2013.01)
*H04L 9/14* (2006.01)
*H04L 9/30* (2006.01)

(52) U.S. Cl.
CPC ............... *H04L 9/30* (2013.01); *H04L 63/06* (2013.01); *H04L 63/08* (2013.01); *H04L 63/0869* (2013.01); *H04L 63/10* (2013.01); *H04L 63/1466* (2013.01)

(58) Field of Classification Search
CPC . H04L 9/30; H04L 9/14; H04L 9/3271; G06F 21/445
USPC ........................................................ 713/168
See application file for complete search history.

(56) References Cited

U.S. PATENT DOCUMENTS

| | | | |
|---|---|---|---|
| 9,363,267 | B2 | 6/2016 | Sugihara et al. |
| 9,854,001 | B1 | 12/2017 | Roth et al. |
| 10,362,141 | B1 | 7/2019 | Thompson et al. |
| 10,574,699 | B1 | 2/2020 | Baer et al. |
| 10,581,977 | B2 * | 3/2020 | Goldfarb ............ H04L 63/0272 |
| 11,075,767 | B2 | 7/2021 | Sugihara et al. |
| 2003/0033545 | A1 | 2/2003 | Wenisch et al. |
| 2006/0031407 | A1 | 2/2006 | Dispensa et al. |
| 2007/0150934 | A1 | 6/2007 | Fiszman et al. |
| 2007/0223685 | A1 | 9/2007 | Boubion et al. |
| 2009/0037983 | A1 | 2/2009 | Chiruvolu et al. |
| 2010/0192229 | A1 | 7/2010 | Fujishima et al. |
| 2012/0297446 | A1 | 11/2012 | Webb et al. |
| 2013/0212603 | A1 | 8/2013 | Cooke et al. |
| 2014/0046906 | A1 | 2/2014 | Patiejunas et al. |
| 2014/0047040 | A1 | 2/2014 | Patiejunas et al. |
| 2014/0189808 | A1 | 7/2014 | Mahaffey et al. |
| 2014/0189845 | A1 | 7/2014 | Cai et al. |
| 2014/0215057 | A1 | 7/2014 | Walsh et al. |
| 2015/0074183 | A1 | 3/2015 | Clothier et al. |
| 2015/0213449 | A1 | 7/2015 | Morrison et al. |
| 2015/0350234 | A1 * | 12/2015 | Reno ....................... H04L 67/02 726/25 |
| 2016/0094551 | A1 | 3/2016 | Sugihara et al. |
| 2017/0214531 | A1 | 7/2017 | Sugihara et al. |
| 2017/0262628 | A1 * | 9/2017 | Kimura ................. G06F 21/552 |
| 2021/0150007 | A1 * | 5/2021 | Franco .................... G06F 21/44 |
| 2021/0397940 | A1 * | 12/2021 | Schneider ............... G06N 3/049 |
| 2022/0210151 | A1 * | 6/2022 | Williams .............. H04L 63/101 |

FOREIGN PATENT DOCUMENTS

| | | |
|---|---|---|
| CN | 102792630 A | 11/2012 |
| WO | 2016/048915 A1 | 3/2016 |

OTHER PUBLICATIONS

Office Action Received for Korean Patent Application No. 10-2017-7009711, dated Aug. 10, 2020, 14 pages(7 Pages of English Translation & 7 Pages of Official Copy).
Non-Final Office Action received for U.S. Appl. No. 14/496,160, dated Oct. 6, 2015, 15 pages.
Notice of Allowance received for U.S. Appl. No. 14/496,160, dated Feb. 12, 2016, 17 pages.
Advisory Action received for U.S. Appl. No. 15/159,398, dated Nov. 15, 2018, 3 pages.
Final Office Action received for U.S. Appl. No. 15/159,398, dated Aug. 27, 2018, 11 pages.
Final Office Action received for U.S. Appl. No. 15/159,398, dated Jul. 9, 2020, 14 pages.
Final Office Action Received for U.S. Appl. No. 15/159,398, dated Oct. 3, 2019, 11 pages.
Non Final Office Action Received for U.S. Appl. No. 15/159,398, dated Feb. 19, 2020, 12 pages.
Non-Final Office Action received for U.S. Appl. No. 15/159,398, dated Feb. 22, 2018, 11 pages.
Non-Final Office Action received for U.S. Appl. No. 15/159,398, dated Feb. 25, 2019, 11 pages.
Non-Final Office Action received for U.S. Appl. No. 15/159,398, dated Dec. 18, 2020, 6 Pages.
Notice Of Allowance received for U.S. Appl. No. 15/159,398, dated Mar. 23, 2021, 7 pages.
Communication Pursuant to Article 94(3) Received for European Patent Application No. 15843512.3, dated Apr. 15, 2020, 8 pages.
Supplemental European Search Report received for European Patent Application No. 15843512.3, dated Apr. 26, 2018, 9 pages.
Written Opinion received for PCT Application No. PCT/US2015/051281, dated Jan. 6, 2016, 6 pages.
Office Action Received for Chinese Patent Application No. 201580052145.9, dated Feb. 22, 2021, 9 Pages (1 Page of English Translation & 8 Pages of Official Copy).
Office Action Received for Chinese Patent Application No. 201580052145.9, dated Mar. 19, 2020, 25 Pages (11 pages of Official Copy and 14 pages of English Translation).
Office Action Received for Chinese Patent Application No. 201580052145.9, dated Oct. 20, 2020, 21 pages (9 pages of Official Copy and 12 pages of English Translation).
International Preliminary Report on Patentability received for PCT Patent Application No. PCT/US2015/051281, dated Apr. 6, 2017, 8 pages.
International Search Report received for PCT Application No. PCT/US2015/051281, dated Jan. 6, 2016, 2 pages.
Votice Of Allowance received for Korean Patent Application No. 10-2021-7015323, dated Feb. 24, 2022, 3 Pages (2 Pages of Official Copy & 1 page of English Translation).
Office Action Received for Chinese Patent Application No. 202110938816.9, dated Dec. 22, 2022, 3 pages (Official copy only).
Office Action Received for Korean Patent Application No. 10-2021-7015323 dated Aug. 28, 2021, 4 Pages (1 Page of English Translation & 3 Pages of Official Copy).

* cited by examiner

TRANSACTION VERIFICATION THROUGH ENHANCED AUTHENTICATION

CROSS-REFERENCE TO RELATED APPLICATIONS

This application is a continuation of and claims the benefit of priority to U.S. patent application Ser. No. 15/159,398, filed May 19, 2016, which is a continuation of and claims the benefit of priority to U.S. patent application Ser. No. 14/496,160, filed Sep. 25, 2014, the benefit of priority of each of which is claimed hereby, and each of which are incorporated by reference herein in its entirety.

TECHNICAL FIELD

The present invention generally relates to computer system security and, more particularly, to verification of computer-initiated transactional requests using enhanced authentication.

BACKGROUND

An application programming interface (API) generally refers to a set of one or more functions, procedures, components, and services provided by a software library or a computer system. Web APIs allow clients to consume API services offered by another computer system over the internet. However, web APIs can be vulnerable to various types of cyber-attacks.

For example, a takeover of a client computer system can provide an attacker with credentials and unlimited access to web APIs accessible from a compromised client. In addition, a man-in-the-middle attacker may intercept and use web API authentication credentials to access private information, credit card accounts, bank accounts, or other secure data by impersonating a client.

Highly restrictive security measures may offer increased web API security. However, such measures can disrupt the flow of legitimate traffic and transactions. Accordingly, improved methods of authentication can provide better protection against takeover, man-in-the-middle, and other types of cyber-attacks while flexibly accepting routine changes occurring on a computer system or network without disrupting legitimate activity.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Systems, methods, and computer program products for verifying transactions using enhanced authentication are disclosed.

In an example, a client computer system seeks to use an application programming interface (API) provided by a server computer system. The server receives a key from the client for encrypting one or more additional authentication challenges to be issued to the client beyond a first level of authentication.

In an example, a client may provide the key to the server at a time of initial account registration and setup, at a subsequent time as part of an account or registration update, when the account associated with the client exceeds a transaction volume threshold, when the account or sales of the account associated with the client exceeds a monetary value threshold, when it is determined that data handled by the account associated with the client is classified as sensitive, based on a request from the server, or at any other time or based on any other criteria.

In an example, the client sends a request to use a server-provided API. The client also provides one or more authentication credentials to allow the server to authenticate the client's API request based on a first level of authentication.

In an example, the server authenticates the API request, analyzes information associated with the client (e.g., identity, location, behavior, etc.), and detects that one or more attributes of the client have changed. In response, the server generates an additional authentication challenge to further authenticate the API request received from the client. In one example, the server encrypts the additional authentication challenge using the key received from the client and sends the encrypted additional authentication challenge to the client.

In an example, the client receives the encrypted additional authentication challenge. In one example, the key for decrypting the encrypted additional authentication challenge is stored in a highly secure area owned by an administrator or other privileged account of the client computer system. The client escalates the encrypted additional authentication challenge to the privileged account having access to the decryption key in the highly secure area. The privileged account then returns the decrypted additional authentication challenge for further processing.

In an example, the server receives a response to the encrypted additional authentication challenge from the client. The server then analyzes the response, determines whether a result of the additional authentication challenge was successful or unsuccessful, and processes the API request received from the client based on the result.

Accordingly, aspects of the present disclosure provide improved security of application programming interfaces (APIs) to protect against server takeovers and man-in-the middle attacks while allowing administrative and other legitimate changes to be made without incident.

Figure 1:
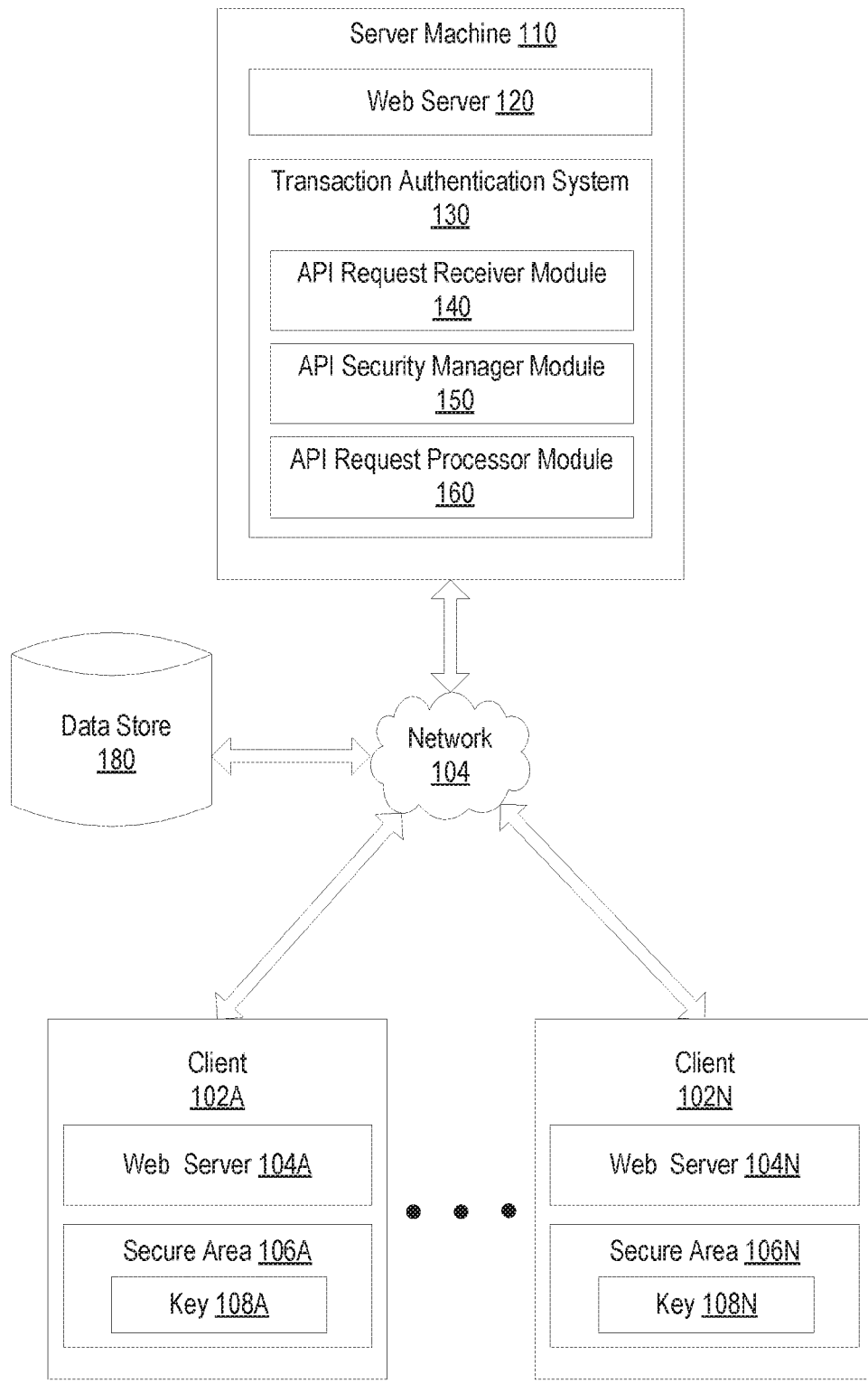
FIG. 1 is a block diagram illustrating a system architecture, in accordance with various examples of the present disclosure.

FIG. 1 illustrates an exemplary system architecture 100 in which examples of the present disclosure may be implemented. System architecture 100 includes a server machine 110, a data store 180 and client machines 102A-102N connected to a network 104. Network 104 may be a public network (e.g., the Internet), a private network (e.g., a local area network (LAN) or wide area network (WAN)), or a combination thereof. In an example, network 104 may include the Internet and/or one or more intranets, wired networks, wireless networks, and/or other appropriate types of communication networks. In one example, the network 104 may comprise a wireless telecommunications network (e.g., cellular phone network) adapted to communicate with other communication networks, such as the Internet.

Data store 180 is persistent storage that is capable of storing various types of data, such as text, audio, video and image content. In some examples data store 180 might be a network-attached file server, while in other examples data store 180 might be some other type of persistent storage such as an object-oriented database, a relational database, and so forth.

Client machines 102A-102N may be personal computers (PC), laptops, mobile phones, tablet computers, server computers, wearable computing devices, or any other computing devices. Client machines 102A-102N may run an operating system (OS) that manages hardware and software of the client machines 102A-102N. A browser (not shown) may run on the client machines (e.g., on the OS of the client machines). The browser may be a web browser that can access content and services provided by a web server 120 of server machine 110. Other types of computer programs and computer scripts also may run on client machines 102A-102N.

Client machines 102A-102N each may include a web server 104A, 104N and a secure area 106A, 106N used to store keys 108A, 108N. Web servers 104A, 104N may include web and/or application servers configured to utilize one or more application programming interfaces (APIs) provided by server machine 110. An API generally refers to an interface provided for utilizing functionality of software components or other software-based services available from a computer system or software library.

APIs may include any software-based API, such as operating system APIs, programming language APIs, web-based APIs, web services (SOAP, REST, etc.), public APIs, private APIs, proprietary APIs, mobile APIs, transactional APIs, etc. In some examples, use of APIs provided by server machine 110 may be secured and/or tied to user accounts of clients 102A-102N. Thus, a client 102A may provide one or more authentication credentials (e.g., a user name and/or password) to server machine 110 to use an API exposed by server machine 110.

In an example, client machines 102A-102N use an API provided by server machine 110 to initiate and complete various types of transactions. For example, client machines 102A-102N may use one or more server machine 110 APIs to purchase goods, sell goods, transfer money, make payments, perform various financial transactions, etc. Client machines 102A-102N may be associated with the same organization or may include computer systems that are operated by different organizations. For example, client machines 102A-102N may be comprised of computer systems of unrelated organizations that each have contracted to utilize services provided from an API on server machine 110.

Clients 102A-102N each may include a corresponding secure area 106A-106N used to store a respective key 108A-108N and other secure data. A secure area 106A-106N generally refers to any area on a computer system that is separate and inaccessible to a web server, application server, computer program or process used to call server machine 110 APIs. For example, a secure area 106A may be a storage area owned by a root account, an administrative user, or another user. In some examples, data access to a secure area 106A requires privilege escalation or assistance from a user or account authorized to access the secure area 106A (e.g., root, administrator, etc.).

Keys 108A-108N generally refer to one or more pieces of information that determine the functional output of a cryptographic algorithm or cipher. For example, a key 108A may be used to encrypt and/or decrypt various types of data and may include symmetric keys, asymmetric keys, hash functions, or any other data that may be used to encrypt or decrypt data. A key 108A may be associated with one or more computer systems of a client 102A. In an example, a key 108A may be associated with a single client 102A computer system or associated with multiple clients 102A-102N.

Server machine 110 may be a rackmount server, a router computer, a personal computer, a portable digital assistant, a mobile phone, a laptop computer, a tablet computer, a camera, a video camera, a netbook, a desktop computer, a media center, or any combination thereof. Server machine 110 may include a web server 120 and a transaction authentication system 130. In some examples, web server 120 and transaction authentication system 130 may run on one or more different machines.

Web server 120 may provide text, audio, and video images from data store 180 to clients 102A-102N. Web server 120 also may provide web-based application services and business logic to clients 102A-102N. Clients 102A-102N may locate, access and consume various forms of content and services from web server 120 using applications, such as a web browser, web servers, application servers, computer programs, etc. Web server 120 also may receive text, audio, video and image content from clients 102A-102N that is saved in data store 180 for purposes that may include preservation and distribution of content. Further, web server 120 may receive API requests from various clients 102A-102N.

In an example, web server 120 is coupled to one or more applications servers (not shown) that provide applications, services, and transactional APIs to clients 102A-102N. For example, web server 120 may provide clients 102A-102N with access to one or more application services, which include but are not limited to banking, electronic commerce, e-mail, social networking, etc. Such functionality also may be provided, for example, as one or more different web applications, standalone applications, systems, plugins, web browser extensions, and application programming interfaces (APIs). In some examples, plugins and extensions may be referred to, individually or collectively, as add-ons.

In an example, some clients 102A-102N may include applications associated with a service provided by server 110. In one example, one or more device types (e.g., smart phones, smart televisions, tablet computers, etc.) may use applications to access content provided by server 110, to issue commands to server 110, and/or to receive content from server 110 without visiting or using web pages.

In an example, functions performed by server 110 and/or web server 120 also may be performed by the client machines 102A-102N, in whole or in part. In addition, the functionality attributed to a particular component may be performed by different or multiple components operating together. Server 110 also may be accessed as a service provided to other systems or devices via appropriate application programming interfaces, and thus is not limited to use with websites.

In an example, transaction authentication system 130 includes an API request receiver module 140, an API security manager module 150, and an API request processor module 160. In other examples, functionality associated with API request receiver module 140, API security manager module 150, and API request processor module 160 may be combined, divided and organized in various arrangements.

In an example, API request receiver module 140 receives API requests sent to server machine 110 by clients 102A-102N. For example, API request receiver module 140 may receive API requests sent from a client 102A to a web or application server running on server machine 110. API request receiver module 140 also may receive one or more API credentials from a client 102A, for example, to authenticate use of a secure API by the client.

In an example, API security manager module 150 receives keys for performing additional authentication of server machine 110 API requests. For example, API security manager module 150 may receive a respective key from each of one or more clients 102A-102N. In one example, API security manager module 150 receives a key from a client 102A, associates the received key with the client 102A, and stores the received key for encrypting one or more additional authentication challenges to be issued to the client 102A.

In an example, a client 102A provides an encryption key to server machine 110 at a time of initial account registration and setup, at a subsequent time as part of an account or registration update, when the account associated with the client 102A exceeds a transaction volume threshold, when the account or sales of the account associated with the client 102A exceeds a monetary value threshold, when it is determined that data handled by the account associated with the client 102A is classified as sensitive, based on a request from the server, or at any other time or based on any other criteria.

In an example, API security manager module 150 associates a client-provided key with a specific client 102A or multiple clients 102A-102N during a registration process where one or more clients 102A-102N are configured to access a secure API provided by server machine 110. In one example, API security manager module 150 identifies and stores information about one or more clients 102A-102N associated with a client-provided key. For example, API security manager module 150 may collect identifying information about each of one or more clients 102A-102N (e.g., machine name, IP address, MAC address, domain, network information, network paths, etc.). Such information may include attributes unique to a client 102A and other general information known about the client (e.g., typical transaction periods, frequency, amounts, etc.). API security manager module 150 may store such information for each of one or more clients 102A-102N in corresponding client profiles.

In an example, API security manager 150 compares identifying information known about a client 102A to new corresponding information gathered, collected or received from a client 102A at another time. For example, API security manager module 150 may compare identifying information known about a client 102A to information associated with or gathered at the time an API interface request is received from the client 102A.

In an example, API security manager module 150 detects a change associated with the client 102A based on one or more of identification information associated with a client 102A, network information associated with a client 102A, usage of a server machine 110 API by a client 102A, transactional attributes of an API request received from a client 102A, etc. For example, API security manager module 150 may generate one or more additional authentication challenges to issue to a client 102A in response to detecting one or more changes associated with identity and/or behavior of the client 102A.

Additional authentication challenges generally refer to a second or extra level of authentication performed by API security manager module 150 to further authenticate a client 102A beyond first-level authentication. In some examples, API security manager module 150 may generate and issue one or more additional authentication challenges to a client 102A randomly, in view of a detected change associated with a client 102A, based on a client 102A request (e.g., during client 102A registration or testing), when a client 102A exhibits suspicious behavior deviating from an observed pattern of past client 102A behavior, in addition to first-level authentication to further authenticate a server machine 110 API request received from a client 102A, etc. In some examples, a first-level authentication challenge may ask a client 102A to provide one or more credentials, such as a username, password, PIN, passphrase, etc.

In an example, an additional authentication challenge may request that a client 102A solve one or more mathematical calculations, answer one or more questions, or perform one or more tasks. In one example, API security manager module 150 issues an additional authentication challenge to a client 102A requesting that the client 102A perform the task of obtaining a resource (e.g., a file) from a particular computer system or network location.

In an example, API security manager module 150 issues an additional authentication challenge involving one or more mathematical problems. For example, API security manager module 150 may ask a client 102A to solve a mathematical problem that is numeric, an equation, a puzzle, or a mathematical problem described in words. In one example, API security manager module 150 asks a client 102A to provide a plurality of answers for a mathematical problem having at least two correct answers (e.g., correct positive and negative answers, etc.).

In an example, API security manager module 150 encrypts an additional authentication challenge generated for a client 102A with a key that has been associated with the client 102A. In one example, API security manager module 150 encrypts an additional authentication challenge with a client 102A associated key prior to issuing the additional authentication challenge to the client 102A. For example, API security manager module 150 may encrypt the additional authentication challenge using a key previously received from the client 102A during a registration process to utilize a server machine 110 API.

In an example, a client 102A provided key received by API security manager module 150 may be used to perform one of symmetric or asymmetric encryption/decryption between server machine 110 and a client 102A. In one example, a key 108A provided to API security manager module 150 by a client 102A may be used both to encrypt and decrypt an additional authentication challenge. In another example, a client may provide a key to API security manager module 150 for encrypting an additional authentication challenge that the client 102A later decrypts using a corresponding, but different key 108A. For example, client 102A may provide API security manager module 150 with a public key for encrypting data that client 102A decrypts using a private key 108A stored in a highly secure area 106A owned by an administrative user account.

In an example, API security manager module 150 issues an additional authentication challenge to a client 102A and waits for a response. In one example, a client 102A receives an encrypted additional authentication challenge issued from API security manager module 150. For example, a web server 104A, application server, or other computer program running on client 102A may receive an encrypted additional authentication challenge from API security manager module 150. The web server 104A, application server, or other computer program running on client 102A then may escalate the encrypted additional authentication challenge to a privileged user account or process having access to a secure area 106A holding a key 108A for decrypting the encrypted additional authentication challenge. The elevated user or process then may decrypt the additional authentication challenge and return the result to the calling web server 104A, application server, or other computer program of client 102A. Client 102A then may process the additional authentication challenge and return a corresponding response to API security manager module 150 for evaluation.

In an example, API security manager module 150 waits for a period of time after issuing an additional authentication challenge to allow a client 102A to receive, process, and respond to the additional authentication challenge. In one example, API security manager module 150 allows a client 102A to respond to an issued additional authentication challenge before a timeout occurs based on a threshold. Further, when API security manager module 150 does not receive a response from a client 102A before a timeout occurs, then a new additional authentication challenge may be issued, an issued additional authentication challenge may be reissued, or the issued authentication challenge may be deemed unsuccessful without further attempt.

In an example, API security manager module 150 receives a response to an issued additional authentication challenge from client 102A, analyzes the response to the additional authentication challenge received from the client 102A, and determines whether the response to the additional authentication challenge is correct or acceptable. In one example, API security manager module 150 then provides a result of the additional authentication challenge to API request processor module 160 based on the determination. For example, API security manager module 150 may indicate whether the additional authentication challenge issued to a client 102A was successful or unsuccessful.

In an example, API request processor module 160 performs one or more activities based on a result of the additional authentication challenge. For example, API request processor module 160 may execute a server machine 110 API request received from a client 102A based on a successful result of an additional authentication challenge. API request processor module 160 also may deny a server machine 110 API request from a client 102A when an incorrect response is received or no response is provided for an additional authentication challenge.

In an example, API request processor module 160 blocks one or more pending or subsequent server machine 110 API requests from a client 102A associated with an unsuccessful additional authentication challenge. API request processor module 160 also may block one or more pending or subsequent server machine 110 API requests from clients 102A-102N related to another client associated with an unsuccessful additional authentication challenge. For example, multiple clients 102A-102N associated with a user account or associated with a party that contracted to use a server machine 110 API may be blocked under such circumstances.

In an example, API request processor module 160 sends a notification to a user associated with a client 102A account, a server 110 account, or a contracted party when an unsuccessful additional authentication challenge occurs and/or a security adjustment is made in response to an unsuccessful additional authentication challenge. For example, API request processor module 160 may notify an account holder by sending an e-mail, initiating a call, sending a text message, etc. In some examples, API request processor module 160 adjusts a risk model associated with one or more clients 102A-102N or accounts based on results of additional authentication challenges.

Figure 2:
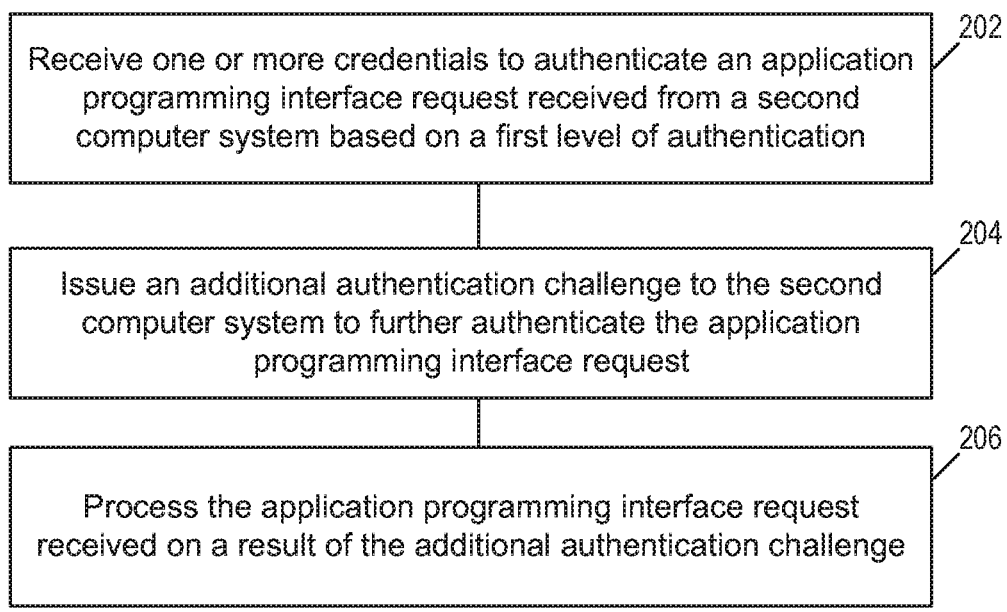
FIG. 2 is a flow diagram illustrating transaction verification using enhanced authentication, according to an example of the present disclosure.

FIG. 2 is a flow diagram illustrating transaction verification using enhanced authentication, according to an example of the present disclosure. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 200 begins at block 202 when an API request receiver module 140 of a transaction authentication system 130 receives one or more credentials to authenticate an application programming interface (API) request received from a second computer system based on a first level of authentication. In an example, API request receiver module 140 receives one or more credentials to authenticate a server machine 110 API request from a client 102A. For example, a client may be prompted or use an available API to provide one or more of a username, password, PIN, passphrase, etc. to satisfy a first-level of authentication associated with a server machine API. In one example, API request receiver module 140 receives client 102A credentials with an API request from the client 102A. Such credentials may be provided by a client 102A, for example, once at the beginning of a session, one or more times throughout a session, or generally any number of times.

At block 204, an API security manager module 150 of a transaction authentication system 130 issues an additional authentication challenge to the second computer system to further authenticate the application programming interface request. In an example, API security manager module 150 generates an additional authentication challenge to further authenticate a server machine 110 API request from a client 102A beyond a standard first-level of authentication. For example, API security manager module 150 may generate an additional authentication challenge that is issued to a client 102A requesting access to or use of a server machine 110 API.

In an example, API security manager module 150 generates and issues an additional authentication challenge to a client 102A in response to detecting a change associated with the client 102A. For example, API security manager module 150 may detect an identity change, a network change, a behavioral change, suspicious transactional behavior, or another change associated with a client 102A. In response, API security manager module 150 may generate and issue one or more additional authentication challenges to the respective client 102A associated with the detected change.

In an example, API security manager module 150 receives a response to an additional authentication challenge from a client 102A. API security manager module 150 then analyzes the response to the additional authentication challenge to determine whether the response is correct or incorrect. In some examples, a client 102A provides an encrypted response to the additional authentication challenge, for example using SSL, to preserve data privacy and to protect the data from unauthorized interception. In one example, API security manager module 150 provides a result of the additional authentication challenge to API request processor module 160 based on the determination. For example, the result provided by API security manager module 150 may indicate whether the additional authentication challenge was successful or unsuccessful.

At block 206, an API request processor module 160 of a transaction authentication system 130 processes the application programming interface request received based on a result of the additional authentication challenge. In an example, API request processor module 160 of a server machine 110 API executes a request received from a client 102A based on a successful additional authentication challenge result. In an example, API request processor module 160 denies a server machine 110 API request from a client 102A based on an unsuccessful additional authentication challenge result.

In an example, API request processor module 160 blocks one or more pending and/or subsequent server machine 110 API requests from a client 102A based on an unsuccessful additional authentication challenge result. In one example, API request processor module 160 blocks one or more pending and/or subsequent server machine 110 API requests from a group of clients 102A-102N associated with one or more unsuccessful additional authentication challenges. For example, a group of two or more clients 102A-102N associated with an account or party that contracted to use a server machine 110 API may be blocked in response to an unsuccessful authentication challenge result for one client 102A.

In an example, API request processor module 160 notifies one or more of a user, a client account holder, or a server machine 110 API owner in response to one or more unsuccessful additional authentication challenges (e.g., a single unsuccessful result, a number of consecutive unsuccessful results, a proportion of unsuccessful results in a sampling of results that exceeds a predefined threshold, etc.). For example, API request processor module 160 may send an e-mail, initiate a call, send a text message, etc. API request processor module 160 also may adjust a risk model associated with one or more clients 102A-102N based on a result of an additional authentication challenge. For example, a client 102A trust level may increase in response to a successful result and may decrease in response to an unsuccessful result.

Figure 3:
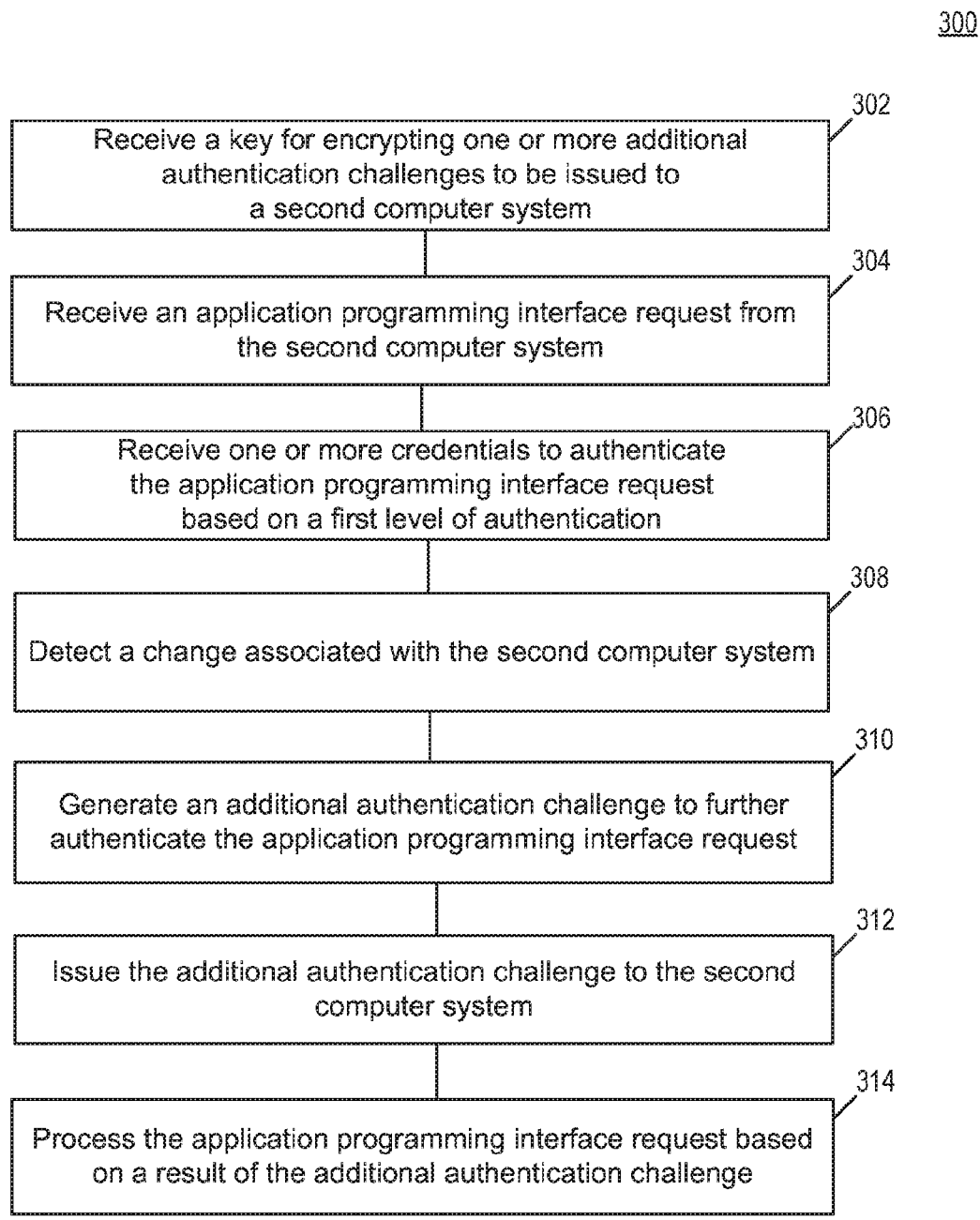
FIG. 3 is a flow diagram illustrating transaction verification using enhanced authentication with encryption, according to an example of the present disclosure.

FIG. 3 is a flow diagram illustrating transaction verification using enhanced authentication with encryption, according to an example of the present disclosure. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 300 begins at block 302 when an API security manager module 150 of a transaction authentication system 130 receives a key for encrypting one or more additional authentication challenges to be issued to a second computer system. In an example, API security manager module 150 receives a key for encrypting additional authentication challenges to be issued to a client 102A. For example, API security manager 150 may receive the key from client 102A as part of a registration process where client 102A is configured to access server machine 110 APIs. In one example, API security manager 150 receives a public key from a PGP key pair for encrypting additional authentication challenges to be issued to client 102A. The public key corresponds to a private key 108A stored in a secure area 106A of the client 102A and is used for decrypting additional authentication challenges by a privileged client 102A account having access to the secure area 106A.

At block 304, an API request receiver module 140 of a transaction authentication system 130 receives an application programming interface request from the second computer system. In an example, API request receiver module 140 receives a server machine 110 API request from a client 102A. For example, a client 102A may send an API request to server machine 110 to call an API providing banking, electronic commerce, e-mail, social networking, or another service.

At block 306, The API request receiver module 140 receives one or more credentials to authenticate the application programming interface request based on a first level of authentication. In an example, API request receiver module 140 receives one or more first-level authentication credentials from a client 102A seeking to access a server machine 110 API. First-level authentication credentials may include any combination of a username, password, PIN, passphrase, etc. In one example, API request receiver module 140 receives one or more first-level authentication credentials with an API request. In another example, API request receiver module 140 receives first-level authentication credentials in a client 102A communication separately from an API request.

At block 308, API security manager module 150 detects a change associated with the second computer system. In an example, API security manager module 150 collects and stores information about one or more clients 102A-102N. For example, API security manager module 150 may gather identifying or other information about each of one or more clients 102A-102N (e.g., machine name, IP address, MAC address, domain, network information, network paths, etc.). Such information may include attributes unique to a client 102A and other general information known about a client 102A (e.g., typical transaction periods, frequency, amounts, etc.). In one example, API security manager module 150 stores such information for each of one or more clients 102A-102N in respective client profiles.

In an example, API security manager 150 compares information known about a client 102A to new corresponding information gathered, collected or received from the client 102A at another time. For example, API security manager module 150 may compare identifying information known about a client 102A to information associated with an API interface request received from the client 102A. In one example, API security manager module 150 detects a change associated with the client 102A based on one or more of client 102A identification information, client 102A network information, usual client 102A behavior, transactional attributes of an API request, frequency of client 102A API requests, etc.

At block 310, API security manager module 150 generates an additional authentication challenge to further authenticate the application programming interface request. In an example, API security manager module 150 generates an additional authentication challenge in response to detecting one or more changes associated with the identity or behavior of a client 102A.

In an example, an additional authentication challenge generated by API security manager module 150 may include one or more mathematical calculations, one or more fact-based, predetermined or secret questions, or one or more tasks. In one example, API security manager module 150 generates an additional authentication asking a client 102A to perform a task of obtaining a resource (e.g., a file, data) from a location.

At block 312, API security manager module 150 issues the additional authentication challenge to the second computer system. In an example, API security manager module 150 issues an additional authentication challenge to a client 102A to further authenticate the identity of the client 102A beyond first-level authentication. For example, API security manager module 150 may issue the additional authentication challenge to a client 102A in response to detecting a change associated with the client 102A. In some examples, API security manager module 150 identifies an identity change, a network change, a behavioral change, suspicious transactional attributes or behavior, or other observed difference associated with a client 102A.

In an example, API security manager module 150 later receives a response to the additional authentication challenge from a client 102A and analyzes the response to determine a result. API security manager module 150 then may provide a result of the additional authentication challenge to API request processor module 160 based on the determination. For example, the result provided by API security manager module 150 may indicate whether a client 102A provided a correct or an incorrect response to the additional authentication challenge.

At block 314 an API request processor module 160 processes the application programming interface request based on a result of the additional authentication challenge. In an API request processor module 160 of a transaction authentication system 130 processes an API request received from a client 102A based on a result of an additional authentication challenge. In an example, API request processor module 160 of a server machine 110 API executes a server machine 110 API request based on a successful result. In another example, API request processor module 160 denies a server machine 110 API request based on an unsuccessful result.

In an example, API request processor module 160 notifies one or more users, account holders, or other parties when an additional authentication challenge is unsuccessful. For example, API request processor module 160 may provide notification by sending an e-mail, initiating a call, sending a text message, etc. In one example, API request processor module 160 adjusts a risk model associated with one or more clients 102A-102N based on a result of an additional authentication challenge. For example, a client 102A trust level may increase in response to a successful result and may decrease in response to an unsuccessful result.

Figure 4:
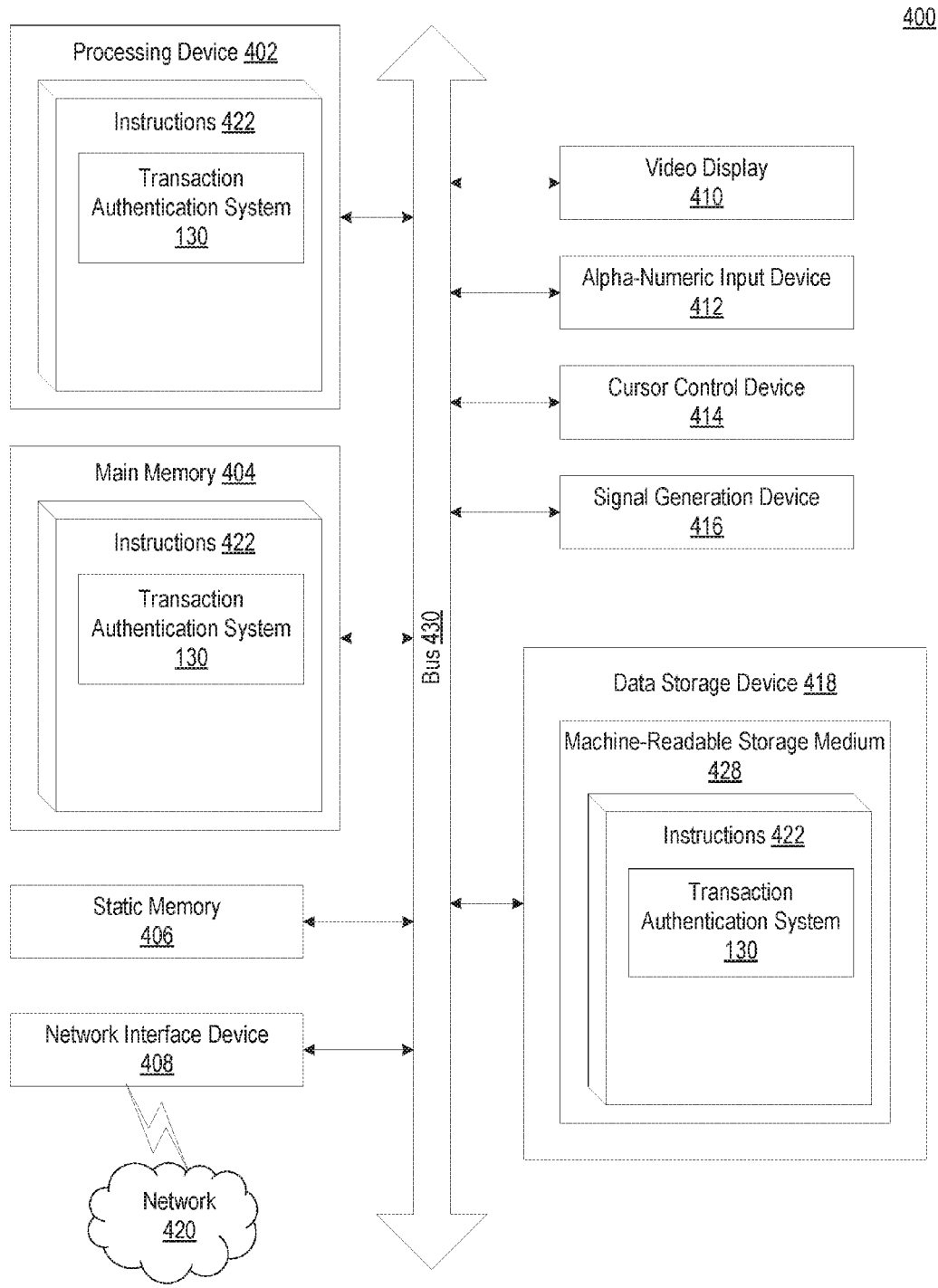
FIG. 4 is a block diagram of an exemplary computer system that may perform one or more of the operations described herein.

FIG. 4 illustrates a diagram of a machine in the exemplary form of a computer system 400 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 428 on which is stored one or more sets of instructions 422 (e.g., software) embodying any one or more of the methodologies or functions described herein. The instructions 422 may also reside, completely or at least partially, within the main memory 404 and/or within the processor 402 during execution thereof by the computer system 400, the main memory 404 and the processor 402 also constituting computer-readable storage media. The instructions 422 may further be transmitted or received over a network 420 via the network interface device 408.

In one example, the instructions 422 include instructions for one or more modules of a transaction authentication system (e.g., transaction authentication system 130 of FIG. 1) and/or a software library containing methods that call a transaction authentication system 130. While the computer-readable storage medium 428 (machine-readable storage medium) is shown in an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result.

The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "transmitting", "receiving," "processing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

The invention claimed is:

1. A computer-implemented method, comprising:
receiving a request to use an application programming interface (API) from a client;
determining that the client deviates from an expected behavior based on comparing the request to use the API with a pattern of activity associated with the client;
responsive to determining that the client deviates from the expected behavior, generating an authentication challenge; and
issuing the authentication challenge.

2. The method of claim 1, wherein the comparing the request to use the API with the pattern of activity associated with the client comprises comparing transactional attributes of the request to use the API with past client behavior.

3. The method of claim 1, the method further comprising issuing a first-level authentication challenge.

4. The method of claim 1, wherein the issuing the authentication challenge comprises at least one of a question to answer or a task to perform.

5. The method of claim 1, wherein the comparing the request to use the API with the pattern of activity associated with the client comprises comparing device information associated with the request to use the API with prior device information associated with the client.

6. The method of claim 1, wherein the comparing the request to use the API with the pattern of activity associated with the client comprises comparing a frequency of the request to use the API request with a typical frequency of requests.

7. The method of claim 1, wherein the comparing the request to use the API with the pattern of activity associated with the client comprises comparing client information associated with the request to use the API with prior client information associated with the client.

8. One or more non-transitory machine-readable media storing computer-useable instructions that, when used by one or more computing devices, cause the one or more computing devices to perform operations, the operations comprising:
receiving a request to use an application programming interface (API) from a client;
determining that the client deviates from an expected behavior based on comparing the request to use the API with a pattern of activity associated with the client;
responsive to determining that the client deviates from the expected behavior, generating an authentication challenge; and
issuing the authentication challenge.

9. The one or more non-transitory machine-readable media of claim 8, wherein the comparing the request to use the API with the pattern of activity associated with the client comprises comparing transactional attributes of the request to use the API with past client behavior.

10. The one or more non-transitory machine-readable media of claim 8, wherein the operations further comprise issuing a first-level authentication challenge.

11. The one or more non-transitory machine-readable media of claim 8, wherein the issuing the authentication challenge comprises at least one of a question to answer or a task to perform.

12. The one or more non-transitory machine-readable media of claim 8, wherein the comparing the request to use the API with the pattern of activity associated with the client comprises comparing device information associated with the request to use the API with prior device information associated with the client.

13. The one or more non-transitory machine-readable media of claim 8, wherein the comparing the request to use the API with the pattern of activity associated with the client comprises comparing a frequency of the request to use the API request with a typical frequency of requests.

14. The one or more non-transitory machine-readable media of claim 8, wherein the comparing the request to use the API with the pattern of activity associated with the client comprises comparing client information associated with the request to use the API with prior client information associated with the client.

15. A computer system comprising:
one or more processors; and
one or more non-transitory machine-readable media storing computer-useable instructions that, when used by the one or more processors, cause the one or more processors to:
receive a request to use an application programming interface (API) from a client;
determine that the client deviates from an expected behavior based on comparing the request to use the API with a pattern of activity associated with the client;

responsive to determining that the client deviates from the expected behavior, generate an authentication challenge; and issue the authentication challenge.

16. The computer system of claim 15, wherein the comparing the request to use the API with the pattern of activity associated with the client comprises comparing transactional attributes of the request to use the API with past client behavior.

17. The computer system of claim 15, wherein the instructions further comprise issuing a first-level authentication challenge.

18. The computer system of claim 15, wherein the issuing the authentication challenge comprises at least one of a question to answer or a task to perform.

19. The computer system of claim 15, wherein the comparing the request to use the API with the pattern of activity associated with the client comprises comparing device information associated with the request to use the API with prior device information associated with the client.

20. The computer system of claim 15, wherein the comparing the request to use the API with the pattern of activity associated with the client comprises comparing a frequency of the request to use the API request with a typical frequency of requests.

* * * * *